United States Patent
Strobel

Patent Number: 5,895,175
Date of Patent: Apr. 20, 1999

[54] PIPE-LAYING DEVICE

[75] Inventor: William R. Strobel, Mt. Morris, N.Y.

[73] Assignees: Philip Cox, Hunt; Frederick Fierthaler, Mt. Morris, both of N.Y.

[21] Appl. No.: 08/751,589

[22] Filed: Nov. 18, 1996

[51] Int. Cl.⁶ ............................................. F16L 1/00
[52] U.S. Cl. ........................................ 405/154; 248/49
[58] Field of Search ............................ 405/154, 157, 405/158, 159, 172; 248/49, 62, 65, 70, 71, 72, 73, 84, 87

[56] References Cited

U.S. PATENT DOCUMENTS

| | | | |
|---|---|---|---|
| 3,568,455 | 3/1971 | McLaughlin et al. | 405/154 |
| 4,043,139 | 8/1977 | Scott | 405/154 |
| 4,090,686 | 5/1978 | Yarbrough | 405/154 |
| 4,126,012 | 11/1978 | Waller | 405/157 |
| 4,826,111 | 5/1989 | Ismert | 405/172 |
| 5,242,247 | 9/1993 | Murphy | 405/154 |
| 5,437,424 | 8/1995 | Netz, Sr. | 248/49 |

*Primary Examiner*—Tamara L. Graysay
*Assistant Examiner*—Frederick L. Lagman
*Attorney, Agent, or Firm*—Salzman & Levy

[57] ABSTRACT

The present invention features a reusable, pipe-laying device with an automatically adjustable, self-locking member that will accommodate pipes having different diameter sizes. The pipe-support unit of the present pipe-laying device slidably supports an angled, locking bar that will tangentially engage with different diameter sizes resting on the pipe-support unit, thus locking them in place. The pipe-support unit is disposed on a contiguous shaft to that of a staking shaft. The locking bar is slidable upon the contiguous, supporting shaft, and thus comes into tangential contact with a pipe, as it is lowered into place. The tangential contact provides the means by which pipes of different diameter sizes engage with, and are locked by, the locking bar.

19 Claims, 4 Drawing Sheets

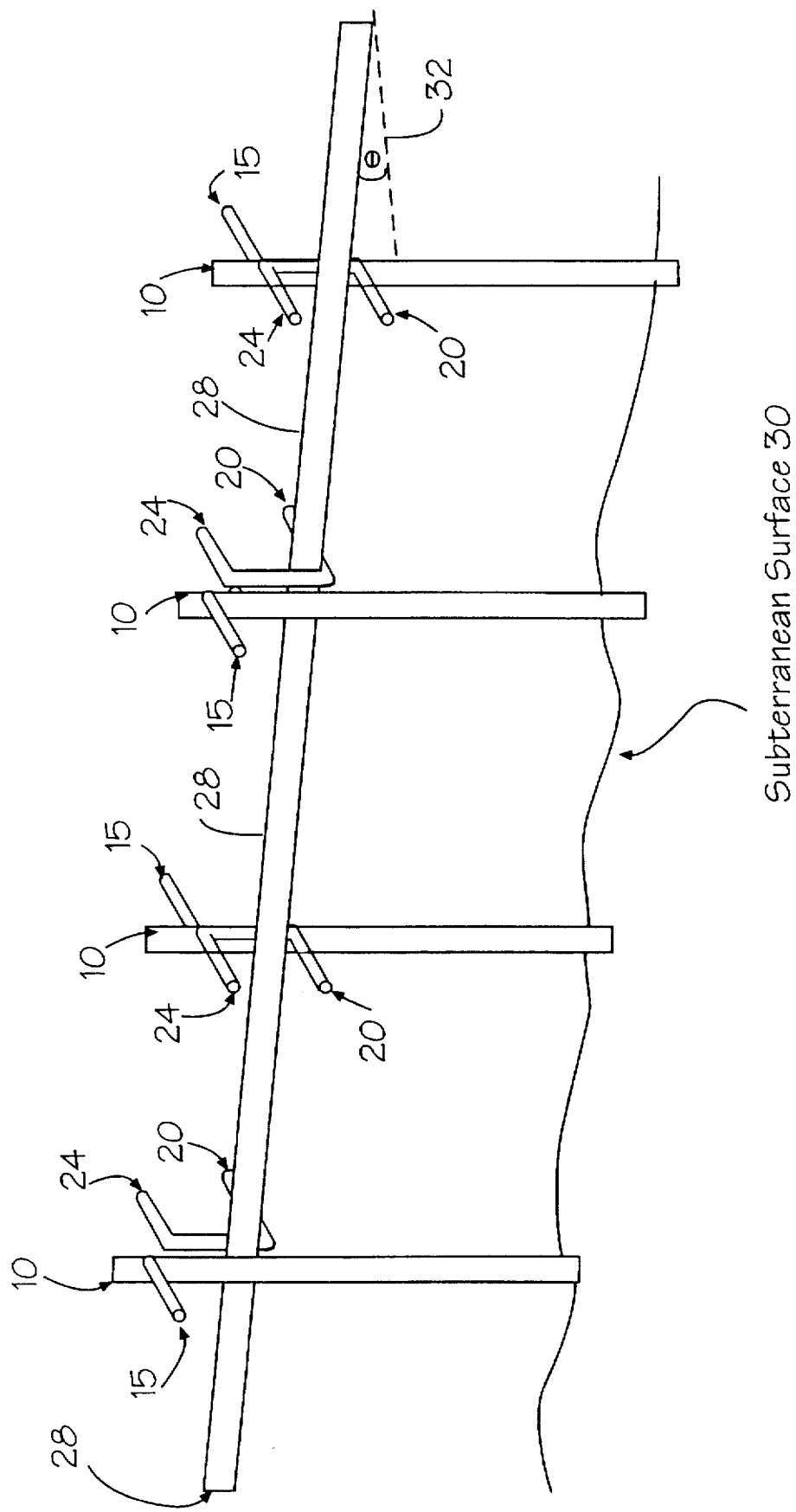

PIPE-LAYING DEVICE

FIELD OF THE INVENTION

The present invention pertains to laying pipe below ground and, more particularly, to a reuseable pipe-laying device that automatically adjusts to, and locks, all currently-used sizes of pipe to a driving stake, thus ensuring that the pipe is laid at a predetermined height above the subterranean surface.

BACKGROUND OF THE INVENTION

In the field of pipe laying, spacing tools have been useful in ensuring that a pipe which is laid below ground is both level and horizontally uniform over its longitudinal length, or, where needed, inclines incrementally to achieve a precise rate of fall (grade) with respect to the prepared, bottom surface of the subterranean trench. Several different staking devices have been developed for this purpose. All of the heretofore developed staking devices feature a horizontal support for a given diameter of pipe. These devices are driven into the ground at spaced-apart intervals, until the pipe support reaches a given distance above the surface of the subterranean trench. The pipe is then laid upon the horizontal support of each stake, thus ensuring that the pipe is level or at a constant-sloped grade along the longitude of the trench. After the earth is filled into the trench to support and cover the pipe, the staking units are removed.

One such spacing tool is shown in U.S. Pat. No. 5,242,247 (issued to MURPHY on Sep. 7, 1993), and entitled "Apparatus for Laying Pipe". This apparatus features a plurality of spaced-apart stakes that are driven into the ground. Each stake has a horizontally disposed pipe support that extends perpendicularly from the vertically disposed stake. The pipe support is disposed upon a slidable sleeve that moves vertically upon the stake to adjust the height of the support. The pipe support can be fabricated in different sizes to accommodate different diameter-sizes of pipes. The support is spring-loaded, so as to fit snugly about the pipe.

Another such spacing tool is illustrated in U.S. Pat. No. 5,437,424 (issued to NETZ, Sr. on Aug. 1, 1995), and entitled "Septic Pipe Field Drain Holders". The pipe-holding device allows for a pipe support to accommodate a given size of pipe diameter. The pipe is disposed upon this support; after the pipe is laid into the trench and the earth is filled in, the support is rotated out of engagement with the pipe. The pipe support is then removed from the ground in order to be used again.

Devices of the prior art feature staking devices that are designed for a given-sized pipe. In other words, each of these devices requires that a predetermined size of pipe exclusively be used with the staking apparatus. It is true that building codes specify a minimum, or, a standard size of pipe for drainage. However, should an odd size pipe be laid for other purposes (such as underground sprinklers, underground watering devices, etc.), then such fixed-diameter tools would not be useful. In such a case, a staking apparatus would require modification or refabrication with a differently-sized supporting component.

The present invention provides an improved staking device over these aforementioned, patented, staking apparatuses.

The current invention features an improved staking device that can accommodate differently-sized pipes and is easily removeable. The pipe-support unit of the present staking device slidably supports an angled locking bar, that will tangentially, automatically engage with different diameter sizes of pipe resting on the pipe-support unit, thus automatically locking them in place. The pipe-support unit is disposed on a shaft that is contiguous to the staking shaft. The locking bar is slidable upon the contiguous, supporting shaft, and thus comes into tangential contact with a pipe, as aforementioned. This tangential contact provides the means by which pipe having different diameter-sizes engage with, and are automatically locked by, the locking bar.

In addition to the self-adjustable, self-locking unit, the staking device of this invention also features a depth ring. This depth ring allows the driving stake to be driven to a given depth, thus eliminating the need for measuring the height at which the pipe is laid above the surface of the subterranean trench.

A further advantage of the present staking device features textured metal surfaces for both the staking and support components. When using the pipe-laying tool, these textured surfaces provide added strength and frictional engagement. Moreover, it features a driving shaft with a blunt, lower end for added friction and resistance to movement.

It has been found that, by using the pipe-laying device of the present invention, a time savings of up to 50% can be achieved over other, conventional pipe-laying processes.

SUMMARY OF THE INVENTION

In accordance with the present invention, there is provided a reuseable pipe-laying device that features an automatically adjustable, self-locking member that will accommodate pipes having different diameter-sizes. The pipe-support unit of the present pipe-laying device slidably supports an angled, locking bar, that will tangentially engage with different diameter-sizes resting on the pipe-support unit, thus locking them in place. The pipe-support unit is disposed on a contiguous shaft to that of a staking shaft. The locking bar is slidable upon the contiguous, supporting shaft, and thus comes into tangential contact with a pipe, as it is lowered into place. The tangential contact provides the means by which pipes of different diameter-sizes engage with, and are automatically locked by, the locking bar.

BRIEF DESCRIPTION OF THE DRAWINGS

A complete understanding of the present invention may be obtained by reference to the accompanying drawings, when considered in conjunction with the subsequent, detailed description, in which:

FIG. 3 is a perspective view of a plurality of pipe-laying devices, disposed in conjunction with one another, and supporting and stabilizing a length of pipe.

For the sake of clarity and brevity, like elements and components will bear the same designations or numbers throughout the FIGURES.

DESCRIPTION OF THE PREFERRED EMBODIMENT

Generally speaking, the invention features an automatically self-adjusting, self-locking pipe-laying device which has a driving stake that is driven to a given depth into the subterranean surface of a trench. A pipe-rest support is attached to the stake; when the stake is driven to the given depth, the support will reach a predetermined height above the subterranean surface. A pipe to be laid within the trench is disposed upon the pipe-rest support. A hollow sleeve containing an angled, extension bar is slidably positioned over the pipe-rest support, and allowed to descend upon the supported pipe. The angled extension bar will automatically come into tangential engagement with the pipe disposed upon the pipe-rest support, thus automatically locking the pipe into place.

Figure 1:
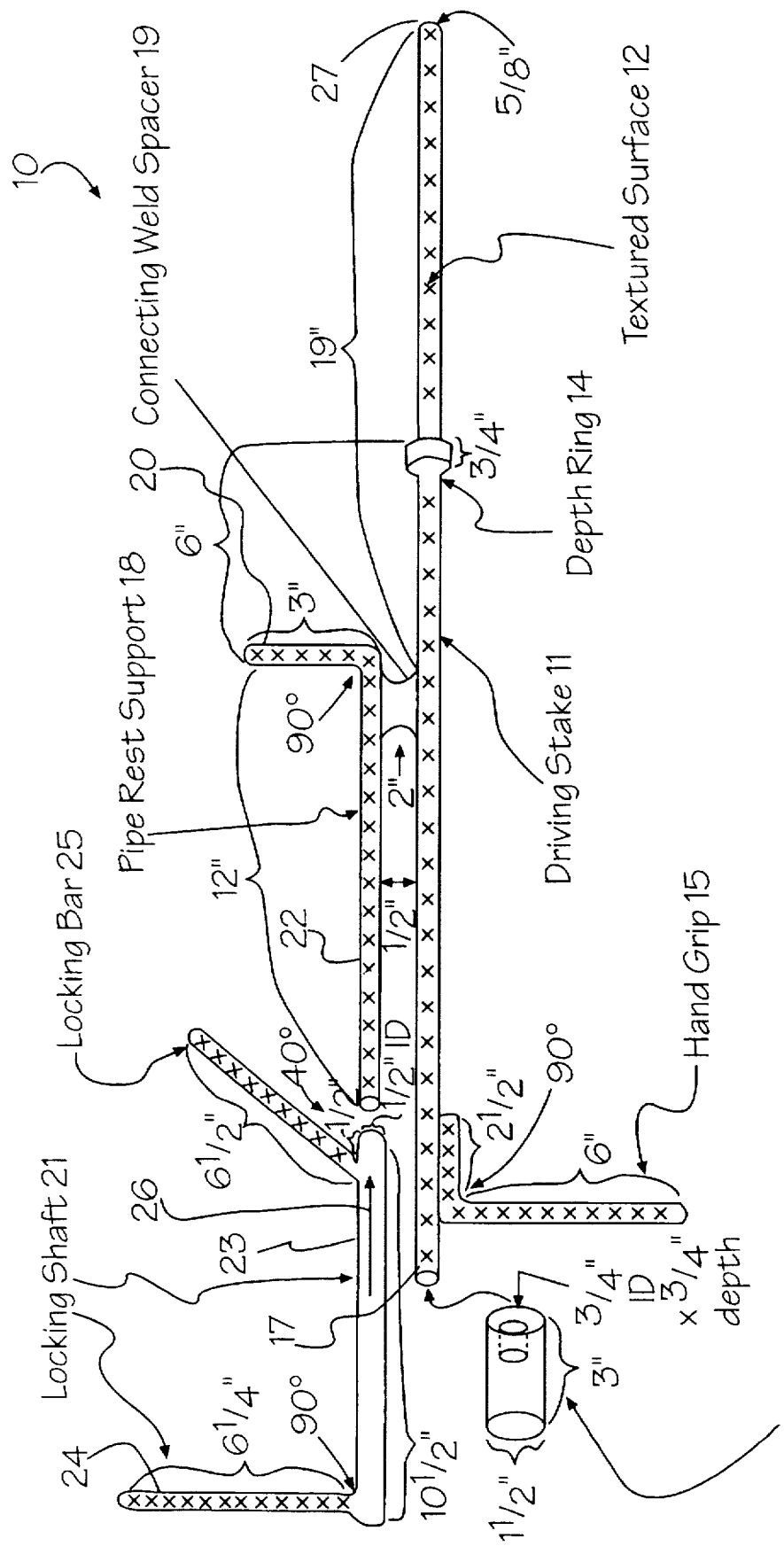
FIG. 1 illustrates a front view of the pipe-laying device of this invention.

Now referring to FIG. 1, the pipe-laying device 10 of this invention is illustrated. The device 10 comprises a driving-stake element 11 that is fabricated from an iron rod having a textured surface 12, with a blunt lower end 27, as shown. The driving stake comprises a depth ring 14, for indicating the depth to which the driving stake 11 can be driven into a subterranean surface of a trench (not shown). The driving stake 11 is driven into the ground by first grasping the hand grip 15 and then either driving the stake with a maul or hammer against its top 17, or placing the drive sleeve 16 over the top 17 of the driving stake 11. The drive sleeve 16 is then hammered with a "slam-bang" or air hammer, until the driving stake 11 is forced into the ground to the depth desired, using the depth ring 14, as a gauge.

Contiguous with the driving stake 11 is a pipe rest support 18, which is permanently fastened to the driving stake 11 by the weld 19. The weld also acts as a spacer between the driving stake 11 and the pipe-rest support 18. The pipe-rest support 18 is fabricated from a textured, iron rod, which is similar to that of the driving stake 11. The pipe-rest support 18 has a right-angle extension bar 20 projecting outwardly therefrom, as illustrated. A pipe to be distanced from the subterranean surface of a trench is placed upon the extension bar 20, after the driving stake 11 is driven to the required depth via the depth ring 14, as shown in FIGS. 2a and 2b.

The connecting weld-spacer 19 spaces the pipe-rest support 18 from the driving stake 11 at about one-half inch. This one-half-inch spacing provides enough clearance for a hollow, locking shaft 21 to slip over the shaft 22 of the pipe-rest support 18. The hollow shaft 23 of the locking shaft 21 has an inner diameter of approximately one-half inch. The outer diameter of the shaft 22 of the pipe-rest support 18 is approximately ⅜ inches, thus allowing the shaft 22 to fit within the hollow shaft 23.

The locking shaft 21 comprises a grip handle 24 and an angled, locking bar 25. The grip handle 24 allows the locking shaft 21 to be grasped and placed upon the shaft 22 of the pipe-rest support 18, as shown by arrow 26. The angled, locking bar 25 extends from the hollow shaft 23 at an angle of approximately 40 degrees to the vertical axis of the pipe-rest support 18, as illustrated.

Figure 2A:
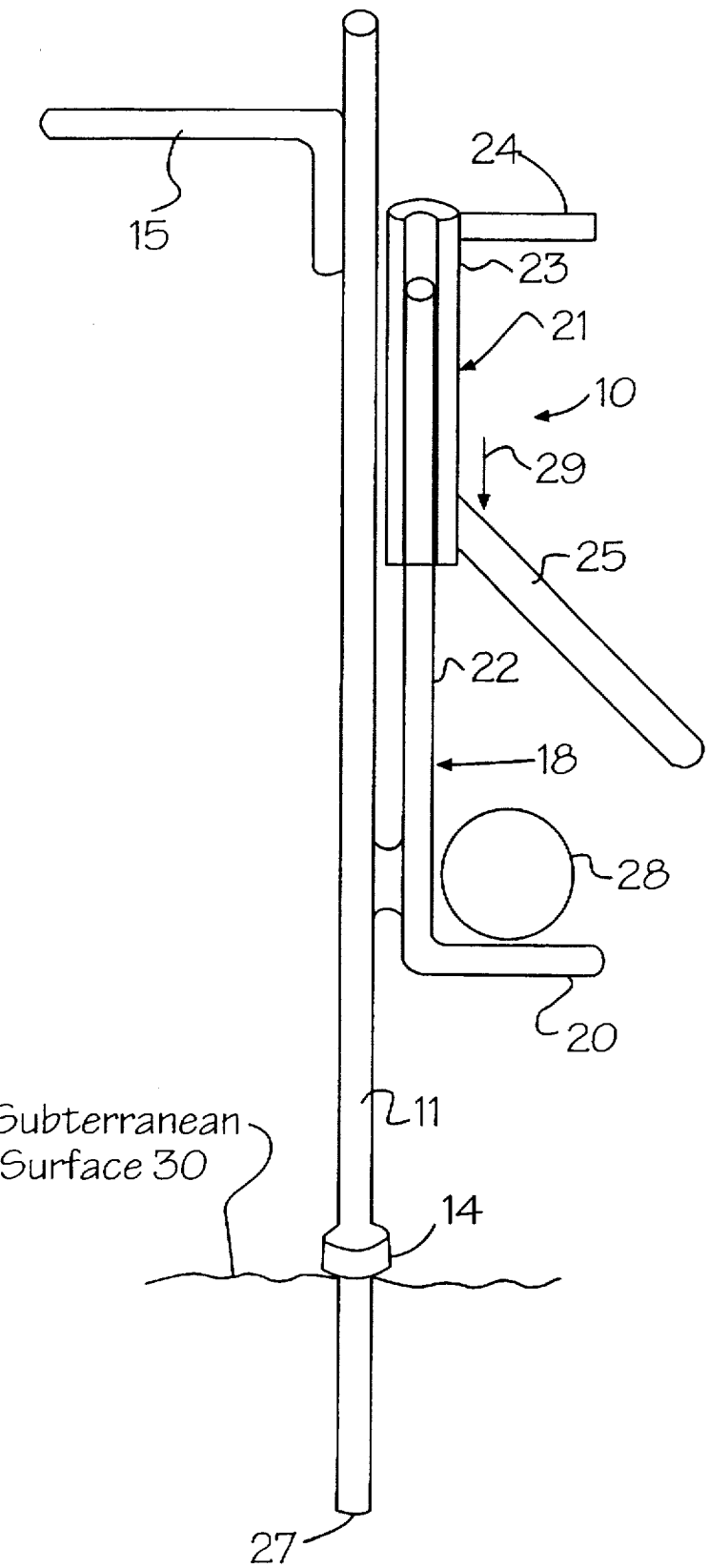
FIG. 2a depicts a front view of the locking unit of the inventive, pipe-laying device in an unengaged position.
Figure 2B:
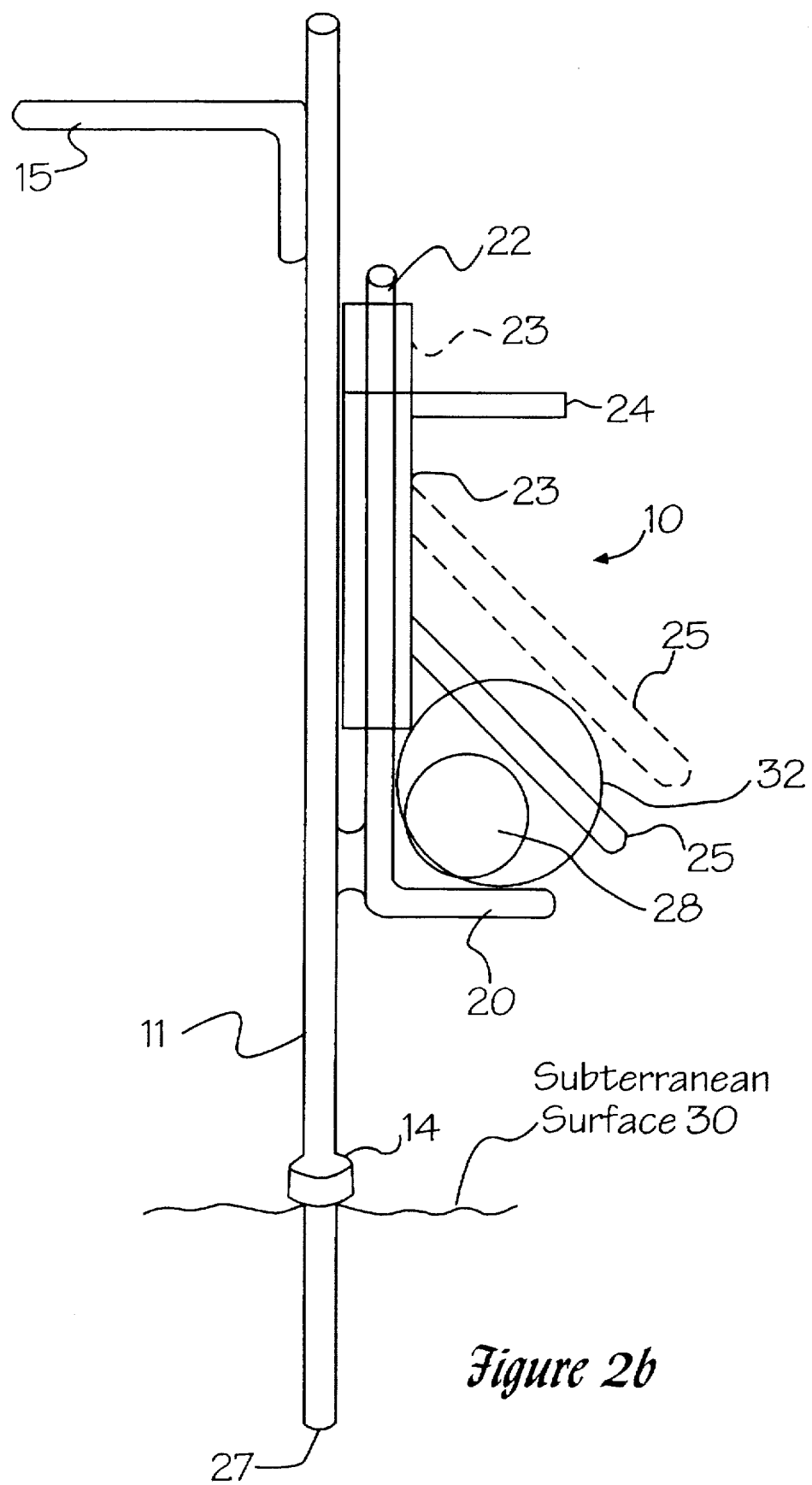
FIG. 2b shows a front view of the locking unit shown in FIG. 2a in an engaged, locking position, the phantom view depicting how the locking unit can engage a pipe diameter having a different diameter size.

Referring to FIG. 2a, the pipe-laying device 10 is shown with the driving stake 11 driven into the subterranean surface 30 of a trench, to a depth determined by the indicating depth ring 14. A pipe 28 to be laid within the trench is placed upon the extension bar 20 of the pipe-rest support 18, as illustrated. The hollow shaft 23 of the locking shaft 21 is placed over the shaft 22 of the pipe-rest support 18, as shown. The hollow shaft 23 is then allowed to slide downwardly (arrow 29) upon the shaft 22, until the self-locking bar 25 comes into tangential contact with the outer surface of the pipe 28, as observed in FIG. 2b.

Referring to FIG. 2b, the self-adjusting, self-locking device 10 is shown in solid lines in a locked position, wherein the pipe 28 to be laid within the trench is automatically locked between the extension bar 20 and the angled locking bar 25. In phantom view, the self-adjusting, self-locking device 10 is illustrated as locking a larger pipe 32 between the angled, self-adjusting, self-locking bar 25 and the support-extension bar 20. The tangential contact of the angled, locking bar with the curved, cylindrical surface of the pipe allows the pipe-laying device 10 to be used with pipes of varying sizes.

The self-adjusting, self-locking, pipe-laying device 10 is driven into the ground at spaced-apart intervals along the trench, until the pipe support 20 reaches a given distance above the surface 30 of the subterranean trench, as aforementioned. The pipe 28 is laid upon the horizontal support 20 of each stake 11, thus ensuring that the pipe 28 is either level or has achieved a specific, substantially constant rate of fall (grade) along the longitude of the trench. After the earth is filled into the trench to support and cover the pipe 28, the self-locking shaft 21 is pulled off of the driving stake 11 and the staking unit 11 is removed by turning the grip handle 24 to rotate the locking bar 25 into disengagement with the pipe 28. Hollow shaft 23 of locking shaft 21 may be used to provide additoinal leverage, if necessary, for removing driving stake 11 by sliding hollow shaft 23 over hand grip 15. After the locking bar 25 is disengaged from the pipe 28, the driving stake 11 can be extracted upwardly from the trench.

Referring now also to FIG. 3, there is shown a perspective view of a plurality of pipe-laying, locking devices 10 (shown without locking bars 25, for simplicity), supporting and stabilizing a length of pipe 28. The devices 10 are oriented 180° with respect to one another, supporting the pipe 28 from the front and the rear thereof, alternatively. This configuration of locking devices 10 assures stability and accuracy of pipe placement, relative to the trench or subterranean surface 30.

Pipe 28 may be levelly supported with respect to the subterranean surface 30, which is the case in most pipe installations. Alternatively, however, as shown in FIG. 3, it may be desirable to position the pipe 28 at a slope, incline, or grade. In that case, successive locking devices 10 can be employed to maintain pipe 28, or section thereof, at a fixed angle [θ−] with respect to the horizontal plane, shown as reference numeral 32.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A reusable, self-adjustable, self-locking, pipe-laying device that can accommodate pipes having different diameters thereupon, comprising:

a driving shaft for driving said reusable, self-adjustable, self-locking, pipe-laying device into a subterranean surface of the ground;

a pipe-rest support including a solid shaft connected to said driving shaft, said pipe-rest support being disposed contiguously adjacent said driving shaft, and having an extension bar projecting therefrom for supporting a pipe to be laid within a trench; and self-locking means including a hollow shaft slidably disposed upon said solid shaft of said pipe-rest support, said self-locking means having an angled, locking bar for tangential engagement with said pipe supported upon said extension bar, thereby locking said pipe therebetween, said tangential engagement of said angled, locking bar with a curved, cylindrical surface of said pipe providing a means by which pipes of different sizes can be locked between said angled, locking bar and said extension bar.

2. The reusable, self-adjustable, self-locking, pipe-laying device in accordance with claim 1, wherein said angled, locking bar is angled at an approximate 40-degree angle to a vertical axis of said pipe-rest support.

3. The reusable, self-adjustable, self-locking, pipe-laying device in accordance with claim 2, wherein said extension bar is approximately disposed at approximately a right angle with respect to said vertical axis of said pipe-rest support.

4. The reusable, self-adjustable, self-locking, pipe-laying device in accordance with claim 1, further comprising a depth ring disposed upon said driving shaft for indicating the depth to which the driving shaft can be driven into said subterranean surface of said ground.

5. The reusable, self-adjustable, self-locking, pipe-laying device in accordance with claim 1, whereby said pipe is laid at a substantially constant grade.

6. The reusable, self-adjustable, self-locking, pipe-laying device in accordance with claim 1, wherein said driving shaft comprises a textured surface.

7. The reusable, self-adjustable, self-locking, pipe-laying device in accordance with claim 1, wherein said driving shaft comprises a substantially blunt lower end.

8. A reusable, self-adjustable, self-locking, pipe-laying device that can accommodate pipes having different diameters thereupon, comprising:

a driving shaft for driving said reusable, self-adjustable, self-locking, pipe-laying device into a subterranean surface of the ground;

a pipe-rest support connected to said driving shaft, said pipe-rest support being disposed contiguously adjacent said driving shaft and having a solid shaft supporting an extension bar projecting therefrom, said extension bar supporting a pipe to be laid within a trench; and self-locking means slidably disposed upon said pipe-rest support, said locking means including a hollow shaft, said hollow shaft of said locking means being slidable over said solid shaft of said pipe-rest support, said locking means having an angled, locking bar for tangential engagement with said pipe supported upon said extension bar, thereby locking said pipe therebetween, said tangential engagement of said angled, locking bar with a curved, cylindrical surface of said pipe providing a means by which pipes of different sizes can be locked between said angled, locking bar and said extension bar.

9. The reusable, self-adjustable, self-locking, pipe-laying device in accordance with claim 8, wherein said angled, locking bar is angled at an approximate 40-degree angle to a vertical axis of said pipe-rest support.

10. The reusable, self-adjustable, self-locking, pipe-laying device in accordance with claim 8, wherein said extension bar is approximately disposed at approximately a right angle with respect to said vertical axis of said pipe-rest support.

11. The reusable, self-adjustable, self-locking, pipe-laying device in accordance with claim 8, further comprising a depth ring disposed upon said driving shaft for indicating the depth to which the driving shaft can be driven into said subterranean surface of said ground.

12. The reusable, self-adjustable, self-locking, pipe-laying device in accordance with claim 8, whereby said pipe is laid at a substantially constant grade.

13. The reusable, self-adjustable, self-locking, pipe-laying device in accordance with claim 8, wherein said driving shaft comprises a textured surface.

14. The reusable, self-adjustable, self-locking, pipe-laying device in accordance with claim 8, wherein said driving shaft comprises a blunt end.

15. A reusable, self-adjustable, self-locking, pipe-laying device that can accommodate pipes having different diameters thereupon, comprising:

a driving shaft for driving said reusable, self-adjustable, self-locking, pipe-laying device into a subterranean surface of the ground;

a pipe-rest support connected to said driving shaft, said pipe-rest support being disposed contiguously adjacent said driving shaft and having a solid shaft supporting an extension bar projecting therefrom, said extension bar supporting a pipe to be laid within a trench, said extension bar projecting at approximately a right angle with respect to said solid shaft; and self-locking means slidably disposed upon said pipe-rest support, said locking means including a hollow shaft, said hollow shaft of said locking means being slidable over said solid shaft of said pipe-rest support, said locking means having an angled, locking bar for tangential engagement with said pipe supported upon said extension bar, thereby locking said pipe therebetween, said angled, locking bar being approximately angled at forty degrees with respect to said hollow shaft, said tangential engagement of said angled, locking bar with a curved, cylindrical surface of said pipe providing a means by which pipes of different sizes can be locked between said angled, locking bar and said extension bar.

16. The reusable, self-adjustable, self-locking, pipe-laying device in accordance with claim 15, further comprising a depth ring disposed upon said driving shaft for indicating the depth to which the driving shaft can be driven into said subterranean surface of said ground.

17. The reusable, self-adjustable, self-locking, pipe-laying device in accordance with claim 15, whereby said pipe is laid at a substantially constant grade.

18. The reusable, self-adjustable, self-locking, pipe-laying device in accordance with claim 15, wherein said driving shaft comprises a textured surface.

19. The reusable, self-adjustable, self-locking, pipe-laying device in accordance with claim 15, wherein said driving shaft comprises a blunt end.

* * * * *